Sept. 2, 1952   C. C. HERBERT   2,608,952
SPRAYING SYSTEM

Filed Oct. 3, 1947   3 Sheets-Sheet 1

INVENTOR
CHARLES C. HERBERT

BY
ATTORNEY

Sept. 2, 1952 C. C. HERBERT 2,608,952
SPRAYING SYSTEM
Filed Oct. 3, 1947 3 Sheets-Sheet 2

INVENTOR
CHARLES C. HERBERT
BY Harper Allen
ATTORNEY

Sept. 2, 1952 C. C. HERBERT 2,608,952
SPRAYING SYSTEM
Filed Oct. 3, 1947 3 Sheets-Sheet 3

INVENTOR
CHARLES C. HERBERT
BY Harper Allen
ATTORNEY

Patented Sept. 2, 1952

2,608,952

UNITED STATES PATENT OFFICE 2,608,952

SPRAYING SYSTEM

Charles C. Herbert, San Jose, Calif., assignor to Livestock Sprayer Mfg. Co., San Jose, Calif., a corporation of California Application October 3, 1947, Serial No. 777,727

13 Claims. (Cl. 119—159)

The present invention relates to livestock sprayers and is concerned more particularly with a livestock sprayer having improved screening means for use in the liquid circulating system of the sprayer.

In spraying animals to control insect pests with expensive insecticide such as DDT, it is desirable to re-use the surplus liquid which drains from the animals to free it of hair and other debris. In sprayers adapted to handle a large number of animals within a short time it is essential to have a strainer which is of a self-cleaning character and which can be quickly removed for cleaning. The sprayer of the instant invention and its improved straining means are designed to attain the foregoing objects among others and to provide for effective re-use of the spray liquid as many times as may be desirable without substantial interruption in the spraying operation.

In addition to the above noted objects, other objects and advantages of the invention will be apparent from the following description of a preferred embodiment of the invention, as illustrated in the accompanying drawings, in which.

Figure 1:
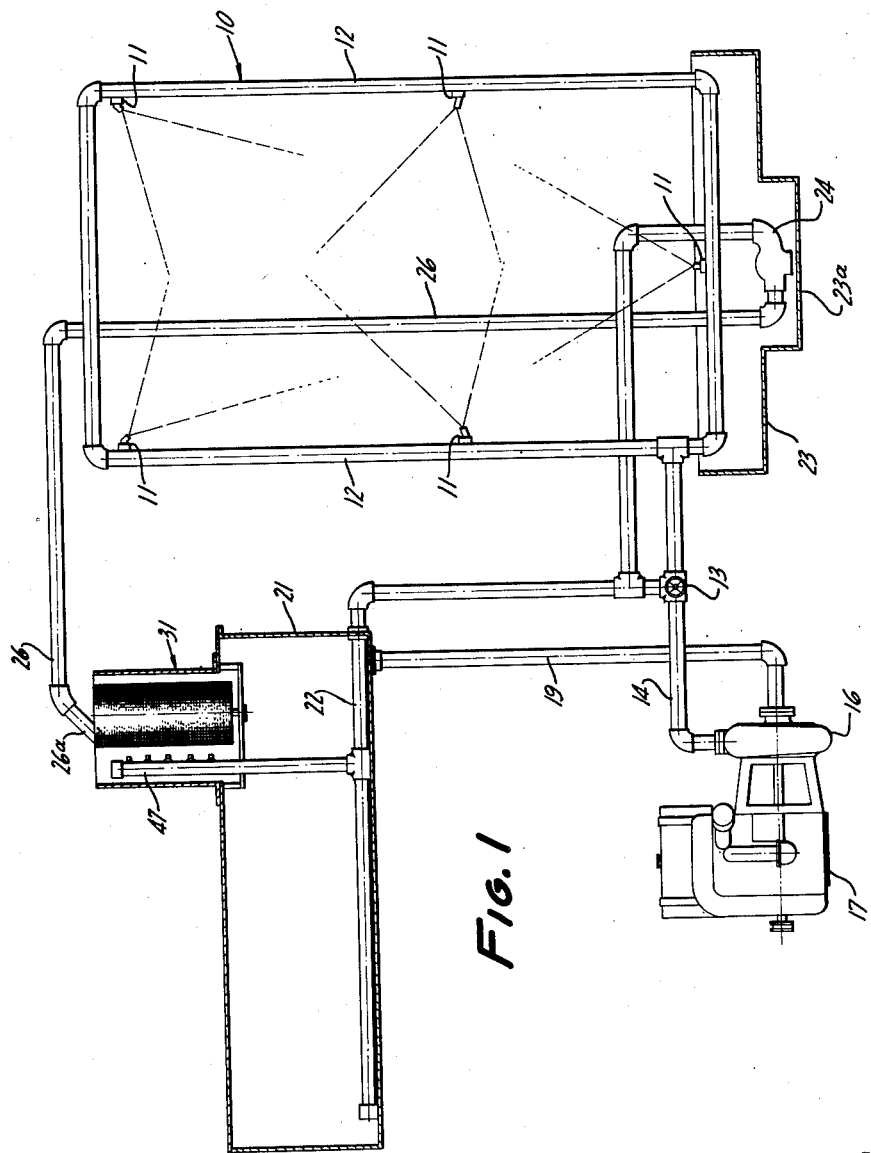
Figure 1 is a schematic view of a livestock sprayer embodying the invention.

As shown schematically in Figure 1, the sprayer includes an enclosure 10 for an animal and the enclosure has a plurality of series of nozzles 11 which are mounted on corresponding branch supply pipes 12. The supply pipes 12 are suitably inter-connected and the flow of liquid thereto is controlled by a two-way valve 13 connected to the main delivery or discharge pipe 14 of a suitable centrifugal pressure pump 16. The source of power for the pump 16 may be a conventional internal combustion engine 17. The intake pipe 19 of the pump 16 is connected to the bottom of a supply tank 21.

For agitation of the spray solution within the supply tank 21 an apertured pipe system 22 is disposed therein having an inlet connected to one outlet of the two-way valve 13 so that in the normal position of the valve, and with the engine and pump in operation, the liquid from the intake pipe 19 is re-circulated in part through the pipe system 22. The other portion of re-circulated liquid will be referred to hereinafter. The other outlet from the two-way valve 13 leads to the nozzle system. To provide for re-circulation of the used spray liquid, the bottom of the sprayer is provided with a drain tank 23 which has a sump portion 23a for cooperation with an injector type hydraulic pickup or pump 24. The high pressure inlet for the injector pump 24 extends to the outlet side of the two-way valve 13 and is in parallel with the agitating pipe system 22 so that when the nozzles are shut off and the engine and pump are in operation, a major portion of the liquid withdrawn from the tank 21 is re-circulated through the injector 24 and the branch discharge pipe 26 thereof. The pipe 26 opens into a filter or strainer 31 in the tank 21. Thus, whenever the nozzle system is shut off the low pressure inlet of the injector 24 will pick up the drainage liquid from the drain tank 23 and re-introduce it through the filter 31 into the system for re-use.

The strainer 31 (Figure 1) is mounted in an elevated position with respect to the supply tank so as to be above the level of liquid therein, and preferably has a quick detachable journal support so that it is rotatable during operation. The strainer 31 (Figures 2 and 3) comprises a cylindrical reticulated screen side wall portion 32 re-inforced by a circular angle iron 33 at the top and secured to an apertured bottom plate 34. The plate 34 has secured thereto an upright axial bearing pipe 36 carrying a cap 37 having a journal screw 38 threaded therein and secured by a suitable locknut. At its lower end the journal screw 38 is provided with a conical recess to fit over the conical end 39a of a journal post 39 which is supported on a plate 41 which acts as a bearing cooperating with the bearing parts 36—37—38 on the strainer 31. The plate 41 is supported by a plurality of mounting studs 42 and spacers 43 from the top wall of the tank 21. Thus the strainer 31 is mounted rotatably in an elevated position with respect to the tank within a housing 21a extending upwardly from the tank 21.

Hydraulic means are provided for effecting the rotation of the strainer and for simultaneously cleaning the screen thereof. The hydraulic means may comprise a plurality of nozzles 46 mounted in a vertical branch pipe 47 connected to and supported by the agitating pipe system 22 so that the nozzles 46 are supplied from a filtered source of spray liquid. As sen in Figure 2, the nozzles 46 are angularly and substantially tangentially disposed with respect to the surface of the strainer 41 so that they impart a force thereto tending to effect clockwise rotation of the strainer as viewed in Figure 2. Also, the high velocity pressure jets from the nozzles will pass through the screen 32 and provide an effective cleaning action. It will be noted that the nozzles 46 are spaced along the length of the strainer so that during each revolution of the strainer substantially the entire screen surface thereof is subjected to the cleaning action of the pressure jets.

Figure 2:
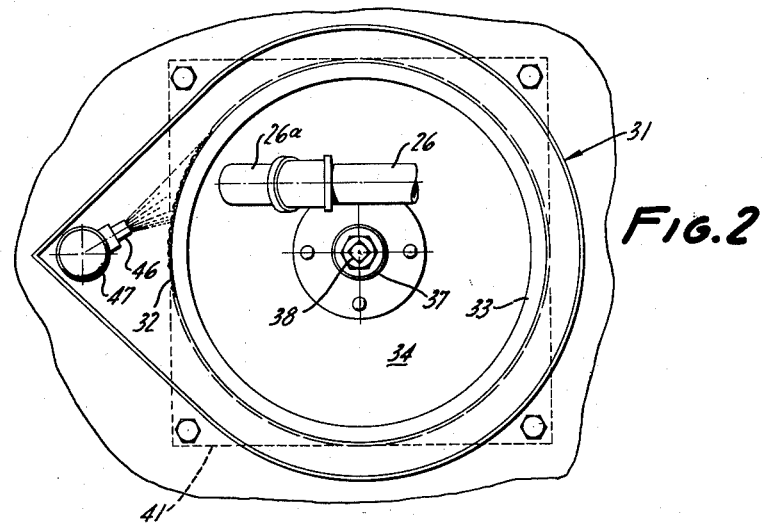
Figure 2 is a plan view of the strainer.
Figure 3:
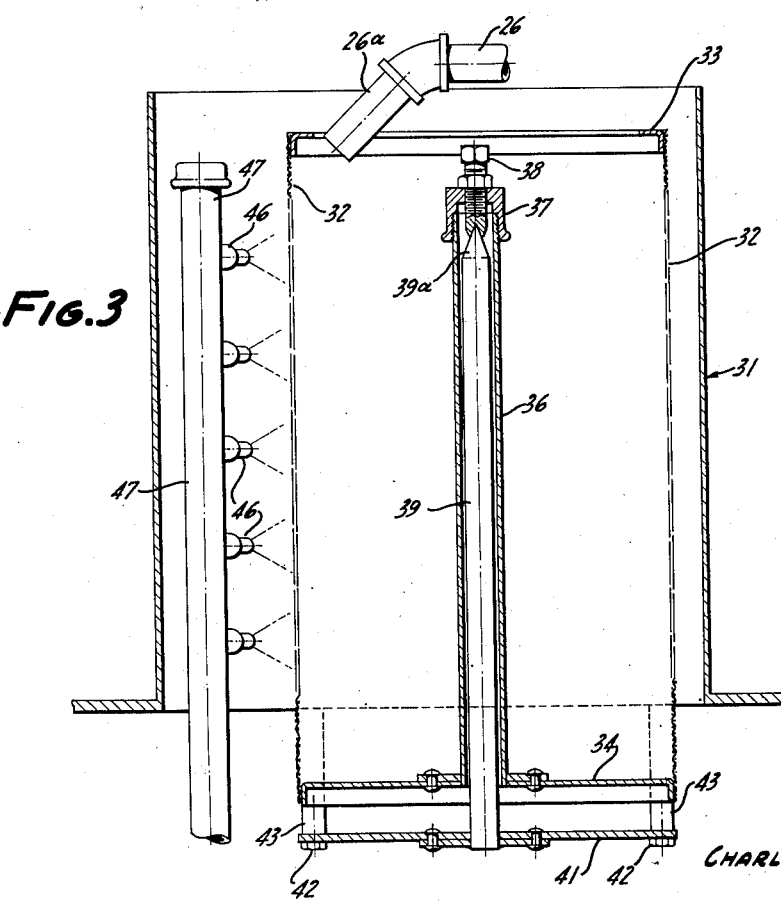
Figure 3 is a fragmentary sectional view through the strainer and its associated parts.

Referring to Figures 2 and 3, it will be seen that the discharge end 26a of the pipe 26 leading from the injector pump 24 is normally disposed to direct the stream of liquid to be filtered against the inner face or inflow side of the screen 32 at the upper portion of the screen in the same region in which the outer face or outflow side is impinged upon by the jets from the nozzles 46 so that the majority of the liquid from the pipe 26 passes directly through the strainer and this allows strained material to lie dormant in the bottom of the strainer. Also, the portion of the screen travelling between nozzles 46 and the outlet or discharge end 26a of the pipe 26 is subjected to a double cleaning action. Consequently, as the strainer revolves the entire upper portion of the strainer is maintained free of debris which enters with the spray liquid from the drain tank and the debris collects in the bottom of the strainer. It will also be noted that by swinging the pipe 26 to one side, the strainer 31 can be quickly removed for emptying, and as easily replaced.

Figure 5:
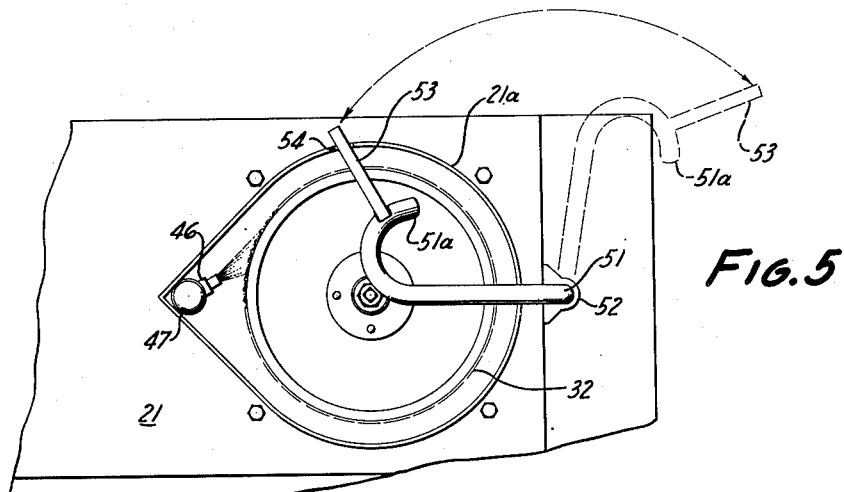
Figure 5 is a plan view of the strainer construction shown in Figure 4.
Figure 4:
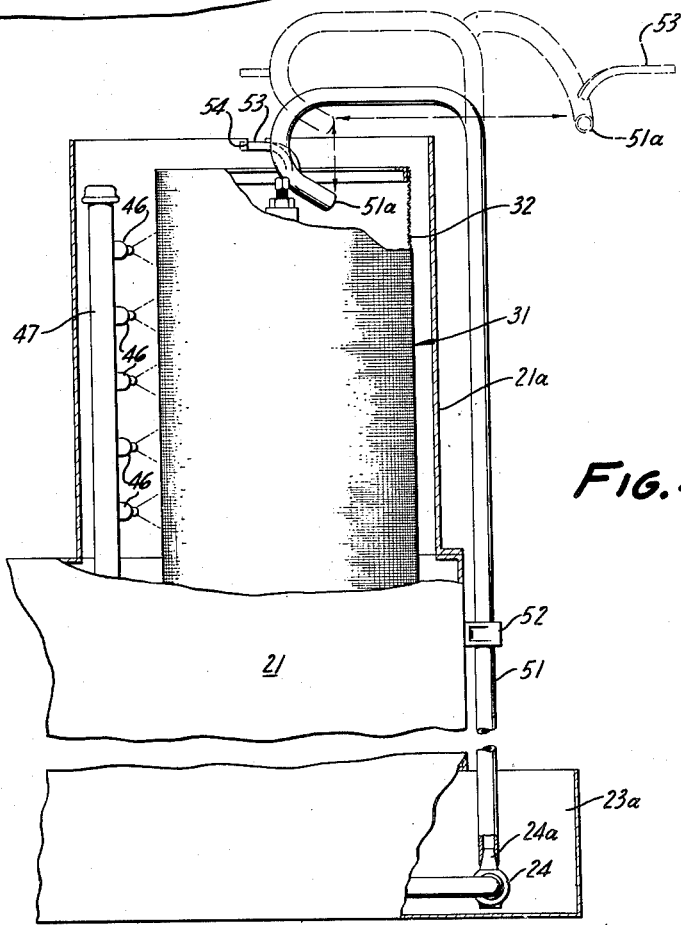
Figure 4 is an elevational view illustrating a modified form of strainer construction.

In the modification of the invention illustrated in Figures 4 and 5, provision is made for the quick adjustment of the inflow pipe to the strainer for easy, fast removal of the strainer for cleaning. Referring to Figures 4 and 5, the injector pump 24 within the sump 23a is provided with a tapered outlet 24a to receive the lower end of a vertical pipe 51 guided in a bracket 52 on the tank 21. The upper end of the pipe 51 is formed to extend over the strainer housing 21a and to curve inwardly and downwardly at 51a to direct the discharge liquid flow against the inner surface of the screen 32 at a point during its rotation removed from the cleaning sprays of the nozzles 46. It will be noted that the angular relation of the discharge end 51a of the pipe with respect to the strainer causes the discharged liquid to aid in the rotation of the strainer. To locate the discharge end 51a of the pipe 51, an arm 53 is secured thereon as by welding which seats in a locating notch 54 in the housing 21a. By virtue of the free detachable connection between the lower end of the pipe 51 and the conical discharge outlet 24a of the injector pump 24, the pipe 51 can be elevated to the dotted line position shown in Figure 4 and then swung clockwise, as viewed in Figure 5, to the dotted line position shown therein. In this position of the pipe 51, the strainer 31 can be lifted freely from within the housing 21a. The breaking of the joint between the lower end of the pipe and the injector 24 allows the discharge from the injector to flow into the sump 23a until the pipe 51 is again placed in active relation to the injector.

While I have shown a preferred embodiment of the invention, it will be understood that the invention is capable of variation and modification from the form shown so that its scope should be limited only by the scope of the claims appended hereto.

I claim:

1. In a fluid circulating system; nozzle means disposed therein; a liquid supply tank; a pressure pump having its intake in communication with said supply tank; a main delivery pipe communicating with the outlet of said pump; a first branch pipe communicating at one of its ends with said main delivery pipe and at its other end with said nozzle means for delivering liquid to said nozzle means; a rotatable strainer positioned to discharge strained liquid to said supply tank; and other branch pipe means communicating with said main delivery pipe and arranged to discharge liquid into said rotatable strainer and against said strainer substantially tangentially with respect thereto for rotating the strainer by hydraulic power generated by said pressure pump transmitted through said main delivery pipe and said other branch pipe means.

2. In a livestock sprayer, nozzle means disposed therein for subjecting an animal to a spray; a spray liquid supply tank; a pressure pump having its intake in communication with said supply tank; a main delivery pipe communicating with the outlet of said pump; a first branch pipe communicating at one of its ends with said main delivery pipe and at its other end with said nozzle means for delivering spray liquid to said nozzle means; a rotatable strainer positioned to discharge strained liquid to said supply tank; a second branch pipe communicating with said main delivery pipe and being arranged to discharge liquid to the interior of said strainer; a third branch pipe communicating with said main delivery pipe; and nozzle means connected to said third branch pipe and being positioned to discharge jets of spray liquid against the outside of and substantially tangentially with respect to said strainer for rotating the latter by hydraulic power generated by said pressure pump transmitted through said third branch pipe, and for also forcibly dislodging solid matter adhering to the inside of the strainer.

3. In a fluid circulating system; nozzle means disposed therein; a liquid supply tank; a pressure pump having its intake in communication with said supply tank; a main delivery pipe communicating with the outlet of said pump; a first branch pipe communicating at one of its ends with said main delivery pipe and at its other end with said nozzle means for delivering liquid to said nozzle means; a cylindrical strainer; bearing means removably mounting said strainer for rotation and in position to discharge strained liquid into said supply tank; and other branch pipe means communicating with said main delivery pipe and arranged to discharge liquid into said rotatable strainer and against said strainer substantially tangentially with respect thereto for rotating the strainer by hydraulic power generated by said pressure pump transmitted through said main delivery pipe and said other branch pipe means, the removable mounting of said strainer enabling it to be dismounted bodily from said bearing means for dumping solid matter from said strainer.

4. In a livestock sprayer; nozzle means disposed therein for subjecting an animal to a spray; a spray liquid supply tank; a pressure pump having its intake in communication with said supply tank; a main delivery pipe communicating with the outlet of said pump; a first branch pipe communicating at one of its ends with said main delivery pipe and at its other end with said nozzle means for delivering spray liquid to said nozzle means; a strainer comprising a bottom, a reticulated cylindrical side wall, and an axial bearing part; a cooperating bearing part mounted on said supply tank and extending vertically for removably receiving said axial bearing part to mount said strainer for rotation about a vertical axis and in position to discharge strained spray liquid to said supply tank; a second branch pipe communicating at one of its ends with said main delivery pipe; means mounting the other end of said second branch pipe so that it may be positioned selectively over said strainer to discharge thereinto, or to one side of said strainer to enable the latter to be removed bodily from said cooperating bearing part for dumping; a third branch pipe communicating with said main delivery pipe; and nozzle means connected to said third branch pipe and being positioned to discharge jets of spray liquid against the outside of and substantially tangentially with respect to said strainer for rotating the latter by hydraulic power generated by said pressure pump transmitted through said third branch pipe, and for also forcibly dislodging solid matter adhering to the inside of the strainer.

5. In a fluid circulating system; nozzle means disposed therein; a main liquid supply tank; a sump below the level of the main supply tank; a pressure pump having its intake in communication with said supply tank above the level of said sump; a main delivery pipe communicating with the outlet of said pump; a selector valve having its intake connected to said main discharge pipe and having first and second outlets; a first branch delivery pipe connected at its opposite ends respectively to one of said valve outlets and to said nozzle means; a second branch pipe connected to the other of said valve outlets; an injector pump having its high pressure inlet connected to said second branch pipe, and having its low pressure intake in communication with said sump, and having an outlet for liquid flowing from said second branch pipe and from said sump through said injector; a rotatable strainer positioned to discharge strained liquid to said supply tank; other pipe means communicating with said injector outlet and with said second branch pipe and being arranged to discharge liquid into said rotatable strainer and against said strainer substantially tangentially with respect thereto for rotating said strainer by hydraulic power generated by said pressure pump; and a control element for said valve operable selectively to direct liquid from said main delivery pipe to said first branch pipe and said nozzle means, or to direct liquid from said main delivery pipe to said second branch pipe and said injector pump to thereby effect injector pick-up of liquid from said sump and delivery thereof to said strainer.

6. In apparatus for removing solid matter from liquid, a liquid supply tank; a rotatable strainer positioned in liquid discharging communication with said supply tank; a pump having its intake in operative interconnected communication with said supply tank; and conduit means for delivering liquid discharged by said pump into said strainer for filtering and conduit means for delivering filtered liquid against said strainer substantially tangentially with respect thereto for rotating the strainer solely by hydraulic power generated by said pump.

7. In apparatus for removing solid matter from liquid, a liquid supply tank; a rotatable cylindrical strainer positioned in liquid discharging communication with said supply tank; a pump having its intake in communication with said supply tank; conduit means interconnected with said pump for delivering liquid discharged by said pump to the inside of said cylindrical strainer; and means interconnected with said pump including a series of nozzles for delivering high velocity jets of liquid discharged by said pump against the outside of said strainer substantially tangentially with respect thereto for rotating the strainer solely by hydraulic power generated by said pump.

8. In apparatus for removing solid matter from liquid, a main liquid supply tank; a supply tank sump below the level of the main supply tank; a pressure pump having its intake in communication with said supply tank above the level of said sump; an injector pump having its low pressure intake in communication with said sump; a pipe connecting the discharge outlet of said pressure pump with the high pressure inlet of said injector pump; a rotatable cylindrical strainer in liquid discharging communication with said supply tank; a pipe communicating with the injector pump outlet and arranged to deliver liquid from said injector pump to the inside of said strainer; and means including a pipe communicating with said pressure pump discharge outlet and with a series of nozzles for delivering high velocity liquid jets against the outside of said strainer substantially tangentially with respect thereto for rotating the strainer solely by hydraulic power generated by said pressure pump.

9. In apparatus for removing solid matter from liquid, an open top strainer comprising a reticulated cylindrical side wall, a bottom therefor, and an axial bearing part; a cooperating bearing part on the strainer; means mounting said cooperating bearing part to extend vertically for removably receiving said axial bearing part to mount said strainer for rotation about a vertical axis; a tank in the apparatus for receiving strained liquid discharged by said strainer; and conduit means for delivering liquid from said tank to said strainer including a pressure pump having its intake in communication with said tank, two branch pipes communicating with the outlet of said pump, one of said branch pipes being equipped with nozzle means positioned to discharge liquid at high velocity substantially tangentially against said strainer side wall for rotating said strainer, and the other of said branch pipes having a discharge end normally positioned above said strainer so as to deliver liquid thereinto, and means mounting the discharge end of said other of said branch pipes for movement from its normal position to permit removal of said strainer from said cooperating bearing part to enable said strainer to be inverted for dumping solid matter therefrom.

10. In a livestock sprayer; nozzle means positioned to spray an animal; a spray liquid supply tank; a pressure pump; an intake pipe providing communication between said supply tank and the inlet of said pump; a main delivery pipe communicating with the outlet of said pump; a first branch pipe communicating at one of its ends with said main delivery pipe and communicating at its other end with said nozzle means for delivering spray liquid to said nozzle means; a rotatable strainer; means mounting said strainer to rotate and to discharge strained spray liquid to said supply tank; other branch pipe means communicating with said main delivery pipe; and means mounting said other branch pipe means to discharge spray liquid against said strainer substantially tangentially with respect thereto for rotating said strainer by hydraulic power generated by said pressure pump transmitted through said main delivery pipe and said other branch pipe means.

11. In a livestock sprayer; nozzle means positioned to spray an animal; a spray liquid supply tank; a pressure pump; an intake pipe providing communication between said supply tank and the inlet of said pump; a main delivery pipe communicating with the outlet of said pump; a first branch pipe communicating at one of its ends with said main delivery pipe and communicating at its other end with said nozzle means for delivering spray liquid to said nozzle means; a cylindrical strainer; bearing means removably mounting said strainer for rotation and in position to discharge strained spray liquid to said supply tank; other branch pipe means communicating with said main delivery pipe; and means mounting said other branch pipe means to discharge spray liquid against said strainer substantially tangentially with respect thereto for rotating said strainer by hydraulic power generated by said pressure pump transmitted through said main delivery pipe and said other branch pipe means, the removable mounting of said strainer on said bearing means enabling said strainer to be dismounted bodily from said bearing means and removed for cleaning accumulated solid matter from said strainer.

12. In a filter mechanism, a substantially cylindrical strainer, means rotatably mounting said strainer, conduit means positioned to discharge liquid material into the interior of said strainer for filtering, and conduit means to discharge filtrate under pressure tangentially against the periphery of said strainer to effect the rotation thereof and simultaneously clean the strainer.

13. In a filter mechanism, a substantially cylindrical strainer, means rotatably mounting said strainer with its axis in upright position, said strainer having an open top and a reticulated side wall, conduit means extending into the interior of said filter through said open top and positioned to discharge liquid material therein for filtering, and conduit means to discharge filtrate under pressure tangentially against the periphery of said strainer to effect rotation thereof and simultaneously clean the strainer.

CHARLES C. HERBERT.

REFERENCES CITED

The following references are of record in the file of this patent:

UNITED STATES PATENTS

| Number | Name | Date |
|---|---|---|
| 374,952 | Falcon | Dec. 20, 1887 |
| 916,481 | Noyes | Mar. 30, 1909 |
| 1,156,515 | Barba | Oct. 12, 1915 |
| 1,212,831 | Spelman | Jan. 16, 1917 |
| 1,712,258 | Compain | May 7, 1929 |
| 2,524,641 | Suttles, Jr. | Oct. 3, 1950 |
| 2,529,530 | Abildgaard et al. | Nov. 14, 1950 |

FOREIGN PATENTS

| Number | Country | Date |
|---|---|---|
| 312,677 | Germany | June 2, 1919 |
| 353,135 | Germany | May 8, 1922 |